(12) United States Patent
Brambs et al.

(10) Patent No.: US 9,977,421 B2
(45) Date of Patent: May 22, 2018

(54) METHOD FOR MACHINING A BLANK BY MEANS OF A TOOL

(71) Applicant: Open Mind Technologies AG, Wessling (DE)

(72) Inventors: Peter Brambs, München (DE); Josef Koch, München (DE)

(73) Assignee: Open Mind Technologies AG, Wessling (DE)

( * ) Notice: Subject to any disclaimer, the term of this patent is extended or adjusted under 35 U.S.C. 154(b) by 154 days.

(21) Appl. No.: 15/035,241

(22) PCT Filed: Nov. 7, 2014

(86) PCT No.: PCT/EP2014/002985
§ 371 (c)(1),
(2) Date: May 9, 2016

(87) PCT Pub. No.: WO2015/067370
PCT Pub. Date: May 14, 2015

(65) Prior Publication Data
US 2016/0274566 A1   Sep. 22, 2016

(30) Foreign Application Priority Data

Nov. 7, 2013 (DE) .......................... 10 2013 112 232

(51) Int. Cl.
| | | |
|---|---|---|
| G05B 19/404 | (2006.01) | |
| G05B 19/402 | (2006.01) | |
| G05B 19/416 | (2006.01) | |

(52) U.S. Cl.
CPC ......... *G05B 19/402* (2013.01); *G05B 19/416* (2013.01); *G05B 2219/34107* (2013.01); *G05B 2219/34175* (2013.01); *G05B 2219/36089* (2013.01); *G05B 2219/49354* (2013.01); *G05B 2219/49363* (2013.01); *G05B 2219/50113* (2013.01)

(58) Field of Classification Search
CPC .......... G05B 19/4099; G05B 19/40937; G05B 19/416
See application file for complete search history.

(56) References Cited

U.S. PATENT DOCUMENTS

| | | | | |
|---|---|---|---|---|
| 5,888,037 A | * | 3/1999 | Fujimoto ............. | G05B 19/416 408/1 R |
| 2007/0241710 A1 | | 10/2007 | Shibui | |
| 2009/0037021 A1 | | 2/2009 | Sladek | |

FOREIGN PATENT DOCUMENTS

| | | |
|---|---|---|
| DE | 10027526 A1 | 1/2001 |
| DE | 69624093 T2 | 1/2003 |
| DE | 10144508 A1 | 5/2003 |
| EP | 1755010 A1 | 2/2007 |
| EP | 2022608 A2 | 2/2009 |
| JP | 2000089814 A | 3/2000 |
| JP | 2007200037 A1 | 8/2007 |

* cited by examiner

*Primary Examiner* — Thomas L Dickey
(74) *Attorney, Agent, or Firm* — Michael Soderman

(57) ABSTRACT

The present invention relates to a method for machining a blank (10) by means of a tool (12) for producing a finished part, wherein the tool (12) is moved during the machining on a guide path (14) comprising at least three successive path segments (16, 18, 20; 16-1, 18-1, 20-1; 16-2, 18-2, 20-2; 18') in the form of two machining segments (16, 20; 16-1, 20-1; 16-2, 20-2) and one connecting segment (18; 18-1; 18-2; 18'), which connects the two machining segments (16, 20; 16-1, 20-1; 16-2, 20-2) to one another, and wherein the connecting segment (18; 18-1; 18-2; 18') of the path segments (16, 18, 20; 16-1, 18-1, 20-1; 16-2, 18-2, 20-2; 18'), which connecting segment connects the two machining segments (16, 20; 16-1, 20-1; 16-2, 20-2), is determined in terms of its shape by the forward feed (F1) of the tool (12) at the end (24) of the first machining segment (16) and by the forward feed (F2) of the tool (12) at the start (30) of the second machining segment (20).

12 Claims, 12 Drawing Sheets

METHOD FOR MACHINING A BLANK BY MEANS OF A TOOL

CROSS REFERENCE TO RELATED APPLICATIONS

This application is the U.S. national stage of International Application No. PCT/EP2014/002985, filed on Nov. 7, 2014, and claims the priority thereof. The international application claims the priority of German Application No. DE 102013112232.9 filed on Nov. 7, 2013; all applications are incorporated by reference herein in their entirety.

BACKGROUND

The invention relates to a method for machining a blank by means of a tool for producing a finished part.

To machine a blank by means of a tool for producing a finished part, the tool is moved on predefined guide paths and paths, respectively, which may be calculated using software. Each single guide path comprises an arbitrary number of successive path segments and path sections, respectively.

Regarding the path segments, there are machining segments and connecting segments. Along a machining segment, the tool engages the material of the blank to perform material removal. A connecting segment leads from the end point of a machining segment to the start point of a subsequent machining segment. Along a connecting segment, usually the tool does not engage the material of the blank. This can be achieved by retracting the tool to some predefined clearance distance above the blank or the workpiece. In that case, usually a higher forward feed is used, e.g. the predefined "rapid" forward feed. However, along a connecting segment, the tool may as well engage the material of the blank and remove material thereof. The connecting movement then takes place directly within the machining area between two machining segments following to each other, e.g. when using a line-by-line machining pattern.

Generally, it is advantageous to perform connecting movements as efficient as possible in order to reduce total machining time. This is even more important for machines used in the production mode of a series production. However, reducing machine load and respecting the acceleration characteristics of the machine is just as important as efficiency. This is especially relevant in the context of high-speed machining, where extremely high forward feeds and strong accelerations are common. To clarify the technological background, in the following some essential technical aspects of machine tools will be explained in more detail.

Machine tools used for milling differ in manifold ways in terms of structure and way of operation. First of all, the number of controllable linear and rotational axes may be different. Three axis machines are able to control three linear axes (X, Y and Z) but no rotational axes (A/B and C). Accordingly, the tool is always oriented orthogonal to the machine table, in other words parallel to the Z axis of the Cartesian machine coordinate system. Four axis machines are additionally able to control one rotational axis (A/B) in order to tilt the tool relative to the Z axis of the machine coordinate system. Five axis machines are most capable in that also the second rotational axis (C) can be operated as well, preferably in such a way that a simultaneous control of all these five available axes is enabled. Such simultaneous control of all axes provides maximal freedom in guiding the tool. However, toolpaths to be calculated for the purpose five axis machines have to contain not only positional data for each machining point but also information with respect to angular values to control both the rotational axes.

A further distinctive feature of five axis machines is the kinematic behavior, i.e., the technical implementation of the control of rotational axes. For each of these axes, a given angle can be adjusted either in swiveling the tool head or, alternatively, in (inversely) swiveling the machine table. Depending on the machine manufacturer, there are many different possibilities: head-head kinematics (both rotational axes located in the tool head), table-table kinematics (both rotational axes located in the machine table) and numerous kinds of mixed kinematics. In this context, in particular the so-called dynamics of a machine is of importance. The dynamic properties determine the acceleration characteristics of the linear and rotational machine axes. There are great differences between the machines depending on the machine kinematics and drive technology as used. However, within a machine, i.e. between the individual axes, the dynamics may vary. For example, often the Z linear axis will have different acceleration properties than the X and Y linear axes. This is called anisotropic axis acceleration.

Machines for high-speed processing (high-speed cutting) represent yet another special category because of the specific requirements. They are characterized by extremely high spindle speeds and strong dynamics, i.e. very high forward feeds and strong accelerations of axes. This still further increases machine load effects resulting from unsuitable tool guidance strategies.

In known methods for machining a blank 110 by means of a tool 112 for producing a finished part according to the preamble of claim 1, as for example described in DE 696 24 093 T2 and/or shown in FIGS. 7a to 7c, the tool 112 is moved on a guide path 114 comprising at least three successive or subsequent path segments 116, 118, 120 in form of two machining segments 116, 120 and one connecting segment 118 which connects the two machining segments 116, 120 with each other. For example, the tool 112 may be a milling tool, a drilling tool or a laser tool.

FIGS. 7a to 7c show different application examples for the machining of holes 122, 122'.

In its simplest form, the connecting segment 118 has a linear shape, corresponding to FIG. 7a. The connecting movement of the tool 112 includes vertical retraction to some clearance distance above the blank 110. First, using an increased forward feed, the tool 112 is lifted vertically from an end point 124 of the first machining segment 116, which coincides with the start point of the connecting segment 118, to the first target point 126 at the defined clearance distance. Next, a linear horizontal connecting movement at this distance or height leads to the second target point 128. Finally, the tool 112 is lead and, respectively, moved down vertically from the second target point 128 to the start point 130 of the second machining segment 120, which coincides with the end point 130 of the connecting segment 118.

As shown in FIG. 7b, the connecting segment 118 again has linear shape. However, to avoid a collision between the blank 110 and the tool 112 in case of an obstacle during connection and the connecting movement, respectively, the clearance distance is enlarged.

Similar situations frequently arise in 5-axis machining, if the tool 112 is moved from one side 132 of the blank 110 to be machined to the next side 134 to be machined. In this case the critical portion of the blank has to be bypassed while considering the defined clearance distance, in the simplest case following a sequence of lines passing along a target point 136, such that the resulting connecting movement of the tool 112 has a polygonal shape as shown in FIG. 7c.

FIGS. 7d and 7e show further application examples relating to the machining of surfaces 138 of the blank 110.

According to FIG. 7d, the connecting movement of the tool 112 in form of for example a milling tool may be carried out for surface machining of surfaces 138 between the two machining segments 116, 120 via the connecting segment 118.

Furthermore, as shown in FIG. 7e for instance, in the context of surface machining, connecting movements of a tool 112 in form of a milling tool may also occur within a local machining area 140, where machining segments are connected directly, i.e., without vertical retraction and thus possibly by engaging the material. Exemplary simple linear connecting movements are provided on the connecting segments 118, 118-1, 118-2 etc. between the machining segments 116, 120, 116-1, 120-1, 116-2, 120-2, 116-3 etc. of a line-by-line zigzag machining pattern with alternating advance direction.

With all of these methods the abrupt direction changes at the start and the end of the horizontal linear connecting movements, e.g. after the vertical retraction and before the vertical touch down, respectively, and at the target points 126, 128, 136 of the afore described linear and polygonal, respectively, shaped connecting segments 118, have been proved as most disadvantageous. Accordingly, such abrupt direction changes are unfavorable because they lead to high machine load, especially at high forward feeds.

For its improvement, in particular for a more machine gentle movement of the tool 112, other known methods therefore propose using curved connecting segments 118, as for example illustrated in FIGS. 8a to 8c for drilling process and in FIGS. 8d and 8e for surface machining.

In this context, in the embodiments of FIGS. 8a to 8e, which correspond to these ones of FIGS. 7a to 7e, curves are used that enable a smooth, i.e. tangent-continuous, course or run of the connecting movements of the tool 112. The transition between the connecting segment 118 and the foregoing and following machining segment 116, 120, respectively, thereby is (also often) tangent-continuous.

As shown in FIG. 8c, curved connecting segments 118 may be also used for a multilateral machining of the blank 110 from one side 132 to the other side 134, if the portion to be circumscribed or bypassed has to be taken into account when calculating the connecting segment 118 and curve, respectively.

Curved connecting segments 118 may also be applied within local machining areas 140, as shown in FIG. 8e.

However, in practice all these methods have proven to be disadvantageous as well. The reason is that the calculation of the connecting segments 118 or connecting curves is based on geometric aspects only. The shape of a connecting segment or a connecting curve exclusively depends on the positions of the points to be connected and possibly on the local tangents adjacent thereto. A calculation of the connecting segments 118 or connecting curves does not respect any non-geometric aspects. In particular, forward feed relationships are not considered. This is very disadvantageous with respect to a machine load reducing and efficient process, also considering the acceleration characteristics of the machine. Additionally, in general the calculated connecting segments 118 or connecting curves have a much greater length than it is actually required, considering the given forward feed values. Moreover, such methods also do not consider the individual dynamic properties of a machine and a possibly anisotropic axis acceleration profile of a machine.

SUMMARY

The present invention relates to a method for machining a blank (10) by means of a tool (12) for producing a finished part, wherein the tool (12) is moved during the machining on a guide path (14) comprising at least three successive path segments (16, 18, 20; 16-1, 18-1, 20-1; 16-2, 18-2, 20-2; 18') in the form of two machining segments (16, 20; 16-1, 20-1; 16-2, 20-2) and one connecting segment (18; 18-1; 18-2; 18'), which connects the two machining segments (16, 20; 16-1, 20-1; 16-2, 20-2) to one another, and wherein the connecting segment (18; 18-1; 18-2; 18') of the path segments (16, 18, 20; 16-1, 18-1, 20-1; 16-2, 18-2, 20-2; 18'), which connecting segment connects the two machining segments (16, 20; 16-1, 20-1; 16-2, 20-2), is determined in terms of its shape by the forward feed (F1) of the tool (12) at the end (24) of the first machining segment (16) and by the forward feed (F2) of the tool (12) at the start (30) of the second machining segment (20).

DETAILED DESCRIPTION

It is therefore an object of the present invention to provide a method for machining a blank by means of a tool for producing a finished part, which allows to avoid the above mentioned disadvantages, is able to use machine tools with less wear and increase efficiency in order to reduce machining time compared to known methods, and allows consideration of machine-specific characteristics and operational parameters of a machine, thus leading to a significant reduction of operating and manufacturing costs in total.

This object is achieved in a surprisingly simple manner by the features of claim 1.

By the embodiment of the method according to the invention for machining a blank by means of a tool for producing a finished part, wherein the tool is moved during the machining on a guide path comprising at least three successive path segments in the form of two machining segments and one connecting segment, which connects the two machining segments to one another, and wherein the connecting segment of the path segments, which connects the two machining segments with one another, is determined in terms of its shape by the forward feed of the tool at the end or end point of the first machining segment and by the forward feed of the tool at the start or start point of the second machining segment, wherein the connecting segment of the path segments, which connects the two machining segments with one another, is deformed towards the higher forward feed at the end or at the start of the two machining segments, the given forward feed values of two successive machining segments are considered in constructing the connecting segment connecting the two machining segments with one another. Moreover, in the method according to the invention, specific dynamic properties of the used machine can be taken into account, such that the calculated shape of the connecting segment is optimal with regard to the individual acceleration profile, thus further contributing to achieve a significant load reduced and efficient machining process. By the way, that the connecting segment of the path segments connecting the two machining segments to one another is deformed towards the higher forward feed at the end or at the start of the two machining segments, with respect to a very machine gentle movement of the tool and tool movement that further reduces machine load, respectively, this results in a steep or steeper course and shape, respectively, of the connecting segment having a lower curvature, where the forward feed is high, and a flat or more flat course and shape, respectively, where the forward feed is lower.

In other words, a significant gentle and efficient use of a machine drivable with tools is reached. This is mostly due to the fact that the forward feed-dependent calculation of the connecting segment complies with the behavior of such machines. Moreover, the method ensures significant reduction of machining time compared to known used methods. Accordingly, the connection segments are individually adapted or matched to the given forward feeds in shape, in course and, not least, resulting therefrom also with respect to segment length. Furthermore, the method according to the invention considers machine-specific characteristics and operational parameters of a machine, for example individual dynamic properties of a machine, anisotropic axis acceleration profiles of a machine etc. Finally, the method according to the invention also helps to reduce total operational and manufacturing costs significantly. Additionally, reducing wear and strain on the machine importantly increases its service life.

Further particularly advantageous features of the method according to the invention are described in claims 2 to 12.

Of particular interest are the measures of claim 2, according to which the connecting segment of the path segments connecting the two machining segments to one another is deformed according to a ratio of the forward feed of the tool at the end of the first machining segment to the forward feed of the tool at the start of the second machining segment. This ratio defines an amount by which the connecting curve is deformed or warped towards to the first segment. In other words, the magnitude of such a deformation can be defined by the ratio between the forward feed values F1 and F2 to one another.

According to claim 3, it is within the scope of the invention that the connecting segment of the path segments connecting the two machining segments to one another is deformed towards the first machining segment, if a ratio of forward feed of the tool is larger than 1, and is deformed towards the second machining segment, if a ratio of the forward feed of the tool is smaller than 1.

Furthermore, of particular advantage are the measures of claim 4, according to which the height or length of the connecting segment of the path segments is determined by the amount of the forward feed of the tool at the end of the first machining segment and/or at the start of the second machining segment.

Preferably the connecting segment of the path segments is adapted according to the features of claim 5 to a corresponding anisotropic acceleration profile of a tool machine holding the tool.

Furthermore, it is within the framework of the invention, to move the tool according to claim 6 during the machining on the guide path with the first machining segment and the second machining segment in engagement with the material of the blank.

Additionally, it is within the scope of the invention, to move the tool according to claim 7 during the machining on the guide path with the connecting segment between the first machining segment and the second machining segment without engagement or, alternatively, with engagement with the material of the blank.

In a very beneficial way, according to the features of claim 8 the tool is moved on the guide path in the area of the connecting segment of the path segments, while the tool orientation is interpolated evenly (linearly) and/or in a forward feed-dependent manner.

Furthermore, it is within the scope of the invention to move the tool according to claim 9 on the guide path having at least two machining segments having alternating advance directions.

Of particular advantage are the measures of claim 10, according to which the tool is moved on a guide path that is embodied in the form of a tangent-continuous or curvature-continuous curve.

Furthermore, the tool according to claim 11 is moved on the guide path in a collision-free manner.

Finally, it is envisaged according to the invention that the tool according to claim 12 is a milling tool, a drilling tool or a laser tool.

BRIEF DESCRIPTION OF THE DRAWINGS

Further characteristics, advantages and details of the invention are contained in the following description of some preferred embodiments of the invention and can be seen in the drawings. The drawings are as follows.

DETAILED DESCRIPTION OF THE PREFERRED EMBODIMENTS

In the following description of various embodiments of a method according to the invention for machining a blank 10 by means of a tool 12 for producing a finished part (not shown), matching equal components are each given identical reference numbers. The type of the machining process, which may be a drilling process and/or a surface machining process, does not affect the method according to the invention. Without restricting the invention, the tool 12 may be a milling tool, a drilling tool or a laser tool.

Figure 1A:
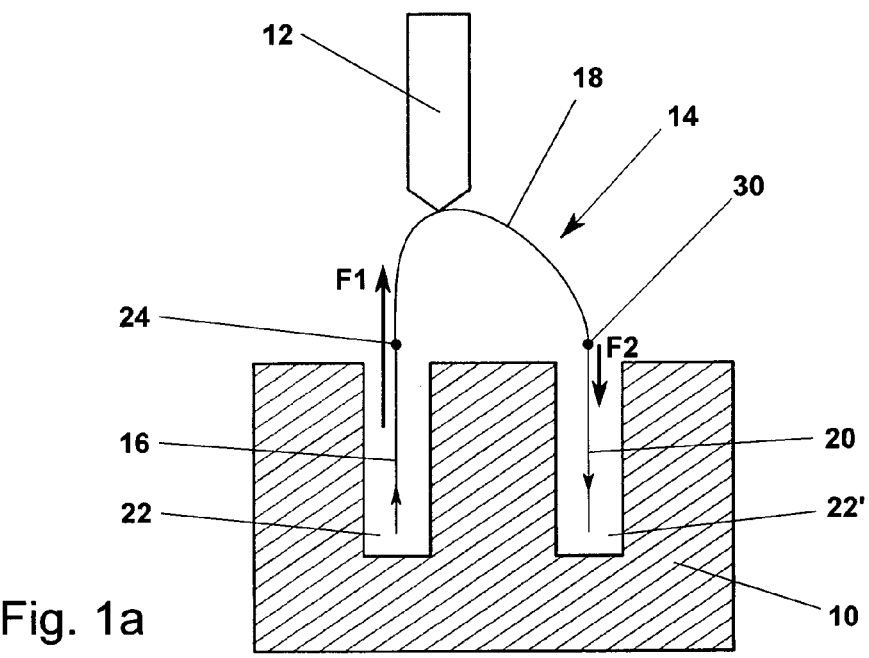
FIG. 1a a schematic sectional view of an embodiment of a method according to the present invention for a drilling process on a blank by means of a tool, FIGS. 1b and 1c schematic sectional views of other embodiments of a method according to the present invention for a drilling process on a blank according to FIG. 1a, FIG. 1d a schematic sectional view of another embodiment of a method according to the present invention for surface machining on a blank according to FIG. 1a, FIG. 1e a schematic top view of yet another embodiment of a method according to the present invention for surface machining within local machining areas of a blank, FIGS. 2a and 2b schematic sectional views of further embodiments of a method according to the present invention for machining a blank corresponding to FIGS. 1a and 1d, FIG. 3 a schematic perspective view, partially truncated, of an embodiment of a method according to the present invention for a drilling process on a blank with machining segments being located arbitrarily in space, FIGS. 4a and 4b a schematic perspective view and a section view of an embodiment of a method according to the present invention for surface machining in local machining areas on several sides of a blank, FIG. 5a a schematic sectional view of an embodiment of a method according to the present invention for machining a blank according to FIG. 1a, in consideration of a uniform (isotropic) axis acceleration profile, FIG. 5b a schematic sectional view of an embodiment of a method according to the present invention for machining a blank according to FIG. 5a, in consideration of a non-uniform (anisotropic) axis acceleration profile, FIGS. 6a and 6b schematic sectional views of other modified embodiments of a method according to the present invention for machining a blank, employing even (linear) and forward feed-dependent interpolation of the tool orientation, FIGS. 7a to 7e schematic sectional views and a top view for illustration of known methods for machining a blank, comparable to FIGS. 1a to 1e, and FIGS. 8a to 8e schematic sectional views and a top view for illustration of other known methods for machining a blank, comparable to FIGS. 1a to 1e.

FIG. 1a schematically shows a first embodiment of a method according to the invention, wherein the tool 12 is moved on a guide path 14 during a drilling process. The guide path 14 comprises at least three successive or subsequent or following path segments 16, 18, 20 in the form of two machining segments 16, 20 and a connecting segment 18 connecting the two machining segments 16, 20 with one another.

The tool 12 in the form of a drilling tool or a milling tool is fed or pulled out of the first machining segment 16, i.e., out of the first hole 22, with a forward feed F1 and is guided directly along the connecting segment 18 to the second machining segment 20, i.e. to the second hole 22', to continue machining with a forward feed F2.

As additionally shown in FIG. 1a, the tool 12 thereby is moved on the guide path 14 from the first machining segment 16 to the connecting segment 18, passing the end or the end point 24, respectively, of the first machining segment 16, which coincides with the start or start point, respectively, of the connecting segment 18. Then, the tool 12 is moved from the connecting segment 18 to the second machining segment 20, passing the start or start point 30, respectively, of the second machining segment 20, which coincides with the end or end point, respectively, of the connecting segment 18.

Corresponding to FIG. 1a, on the connecting segment 18 a retraction of the tool 14 to a certain clearance distance occurs. Thereby, the connecting segment 18 of the path segments 16, 18, 20 connecting the two machining segments 16, 20 to one another, particularly its shape and course, respectively, is determined by the forward feed F1 of the tool 12 at the end 24 of the first machining segment 16 and the forward feed F2 of the tool 12 at the start 30 of the second machining segment 20.

Preferably, in this context, the connecting segment 18 of the path segments 16, 18, 20, which connects the two machining segments 16, 20 with one another, is deformed towards or in direction to the higher of the forward feed values F1, F2 at the end 24 or at the start 30 of the two machining segments 16, 20.

Without providing any further detail, the forward feed F1 of the tool 12 at the end 24 of the first machining segment 16 and the forward feed F2 of the tool 12 at the start 30 of the second machining segment 20 are predefined. Thus, it is determined which one of the forward feeds F1, F2 at the end 24 of the first machining segment 16 or at the start 30 of the second machining segment 20 is higher.

Such a deformation of the connecting segment 18 may be also preferably determined by the ratio F1/F2 of the forward feeds. Accordingly, the connecting segment 18 of the path segments 16, 18, 20 is deformed towards the first machining segment 16, in case of a ratio F1/F2 being larger than 1, and is deformed towards the second machining segment 20, in case of a ratio F1/F2 being smaller than 1.

In each of the embodiments presented in FIGS. 1a to 6b, the forward feed F1 is chosen higher than the forward feed F2, which is indicated by the different lengths of the arrows F1 and F2. According to the invention, therefrom results a deformation of the connecting segment 18 each towards or in direction to, respectively, the first machining segment 16. The amount and the magnitude, respectively, of such a deformation may preferably be determined, for example, based on a ratio of the forward feed values F1 and F2 to each other. Mathematically, such a deformation may be described by shifting the control points of a spline curve. Tangent-continuity at the transition between the first machining segment 16 and the connecting segment 18 at end point 24 and start point, respectively, and between the connecting segment 18 and the second machining segment 20 at the end point and start point 30, respectively, is not affected by the deformation.

Figure 1B:
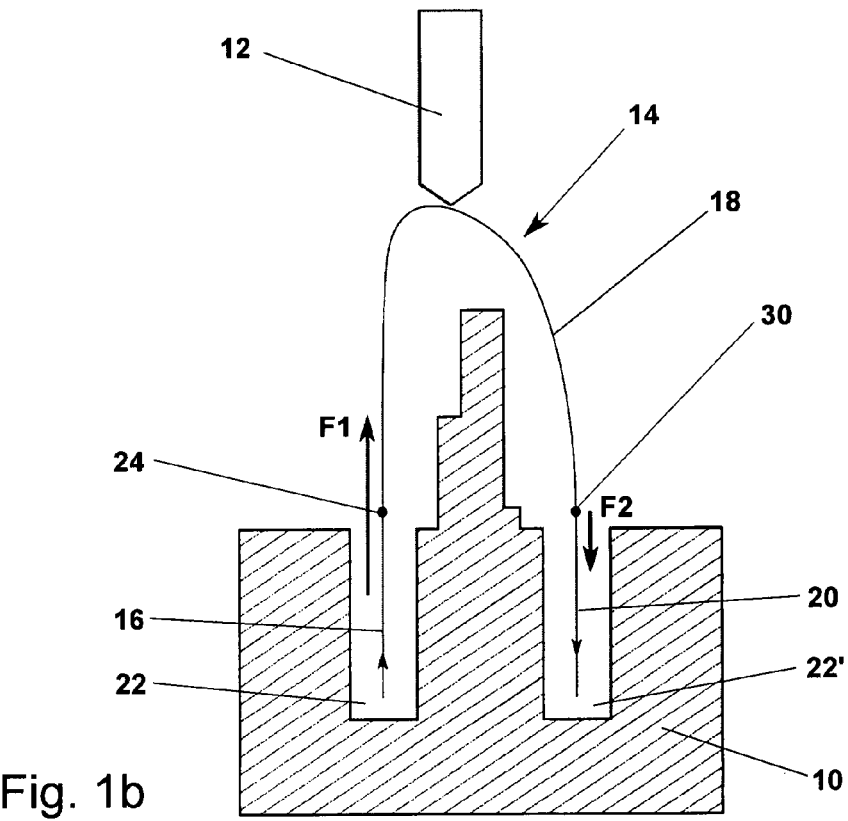

The embodiment of the present invention of FIG. 1b, which also represents a drilling process, differs from that one shown in FIG. 1a in that there is an obstacle between the machining segments 16, 20 or two holes 22, 22', respectively. In order to avoid collisions, it is envisaged according to the embodiment of the method according to the invention to increase the clearance distance, leading to a much steeper course of the path.

Figure 1C:
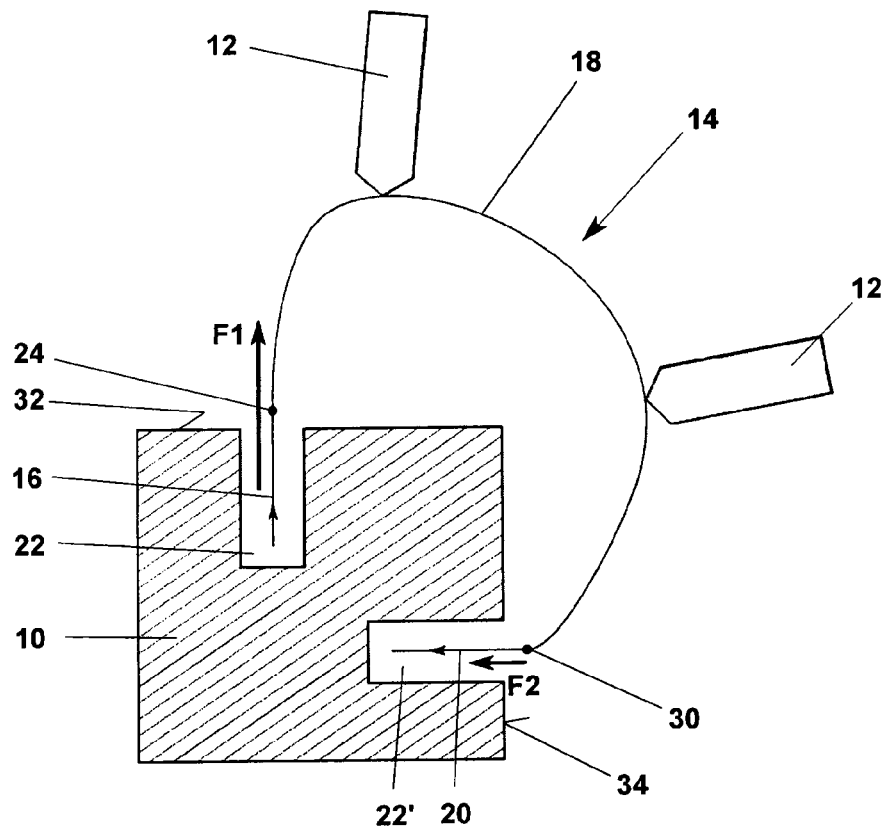
Figure 8A:
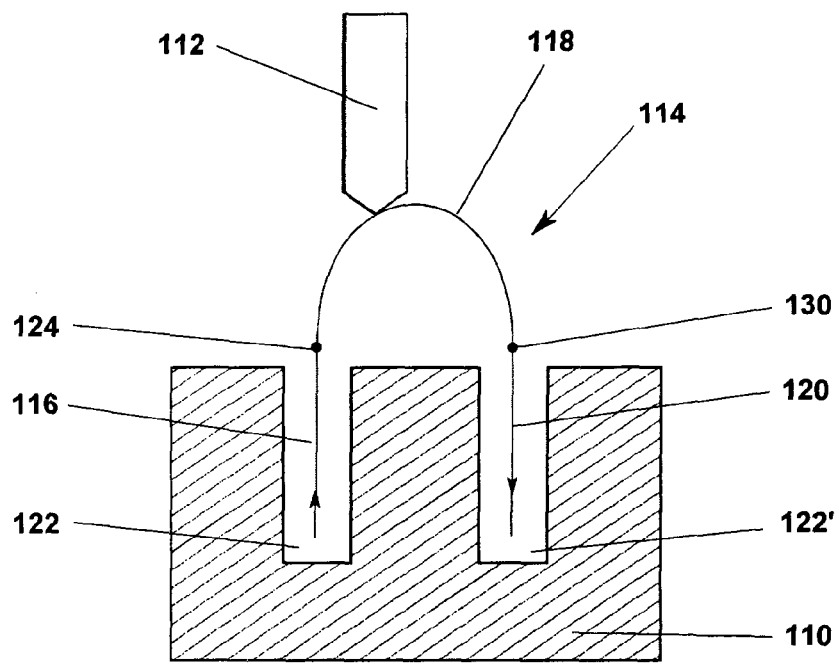
Figure 8B:
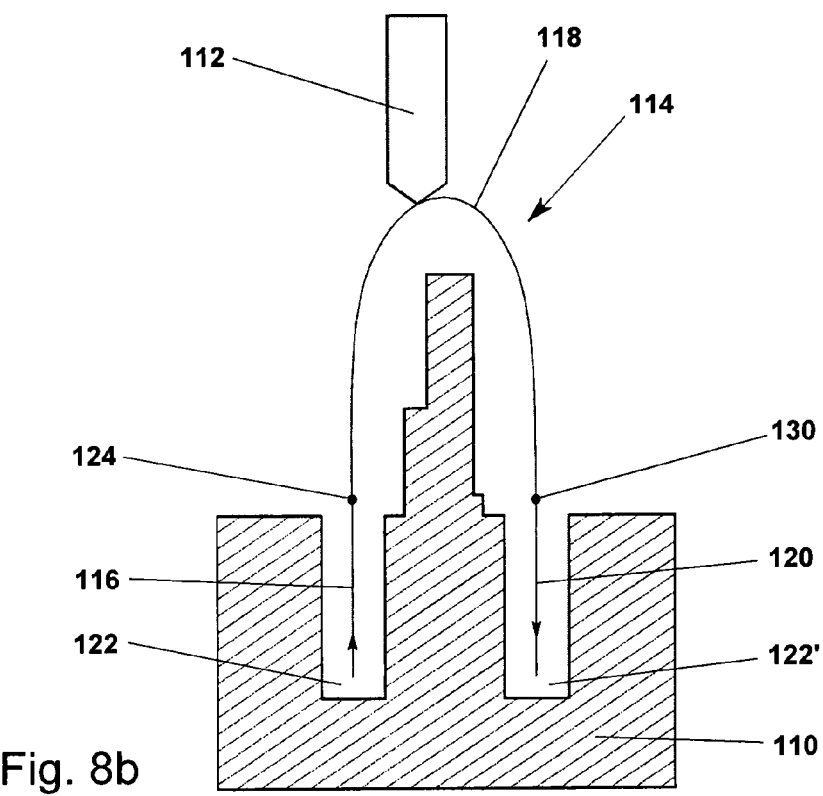
Figure 8C:
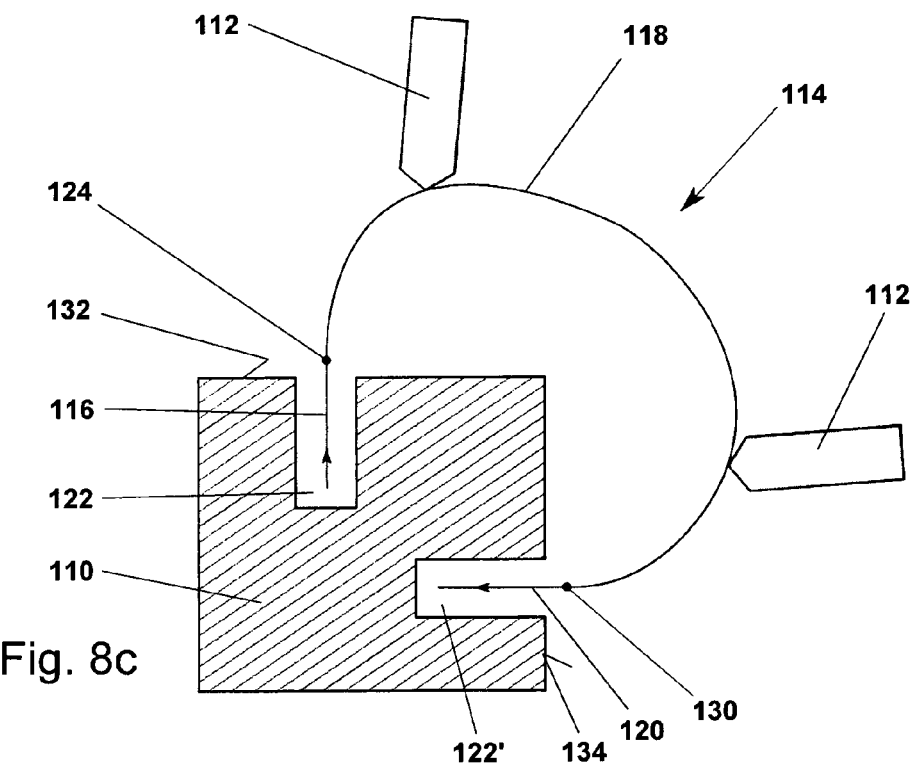
Figure 8D:
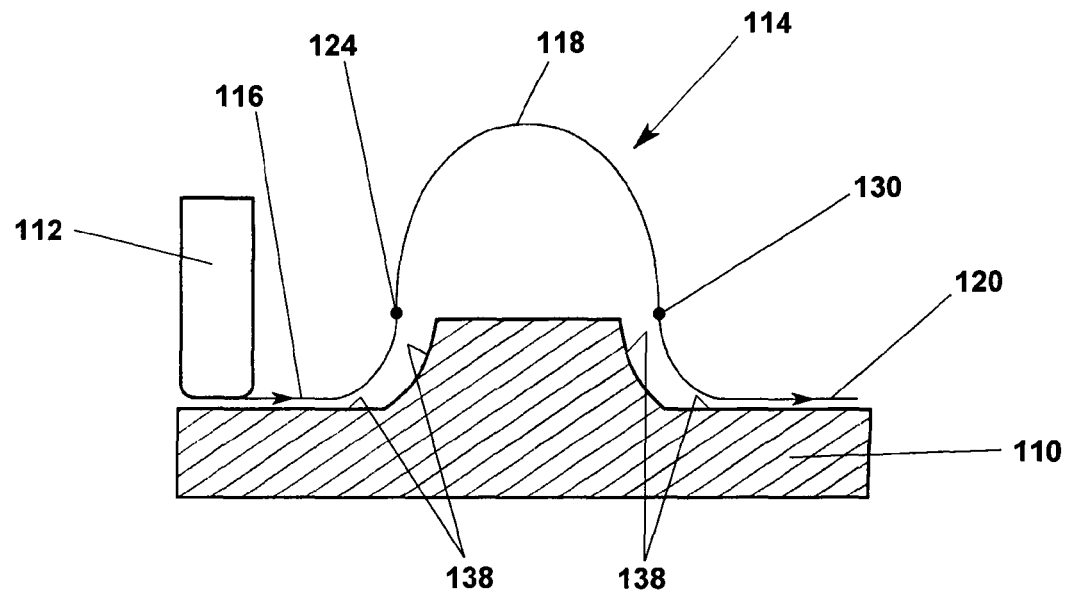
Figure 8E:
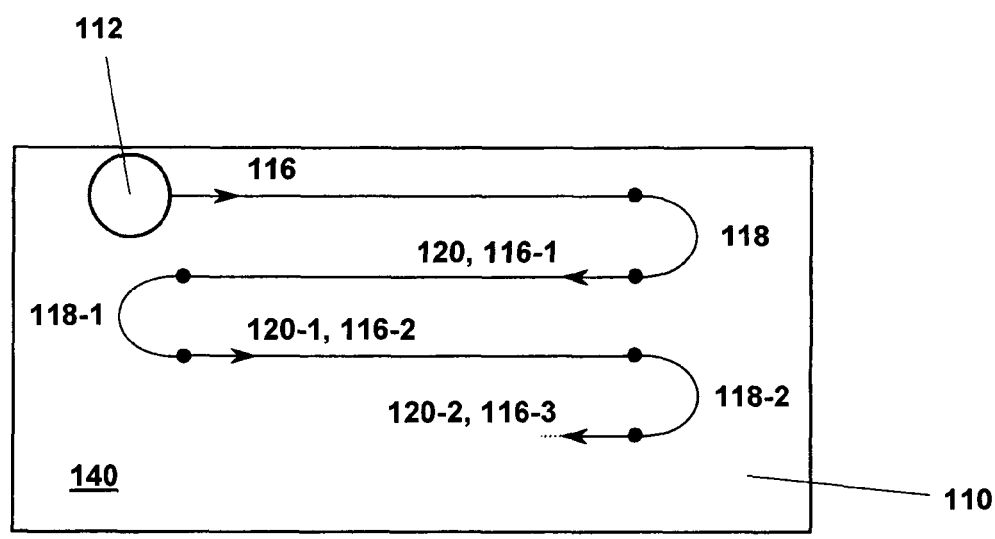

With the embodiment of the method according to the invention shown in FIG. 1c representing a 5-axis drilling process a changeover of the tool 12, e.g. in the form of a drilling tool or a milling tool, is provided from one side 32 of the blank 10 to another side 34 on different sides machining. As apparent from the surfaces of the two sides 32, 34, the two holes 22, 22' are essentially orthogonal to each other. Although not shown in detail, it is easily conceivable that the holes 22, 22' are inclined to each other within the same plane. Analogous to FIG. 8c, the portion to be bypassed is taken into account in the calculation of the connecting segment 18 or the curve, respectively.

Figure 1D:
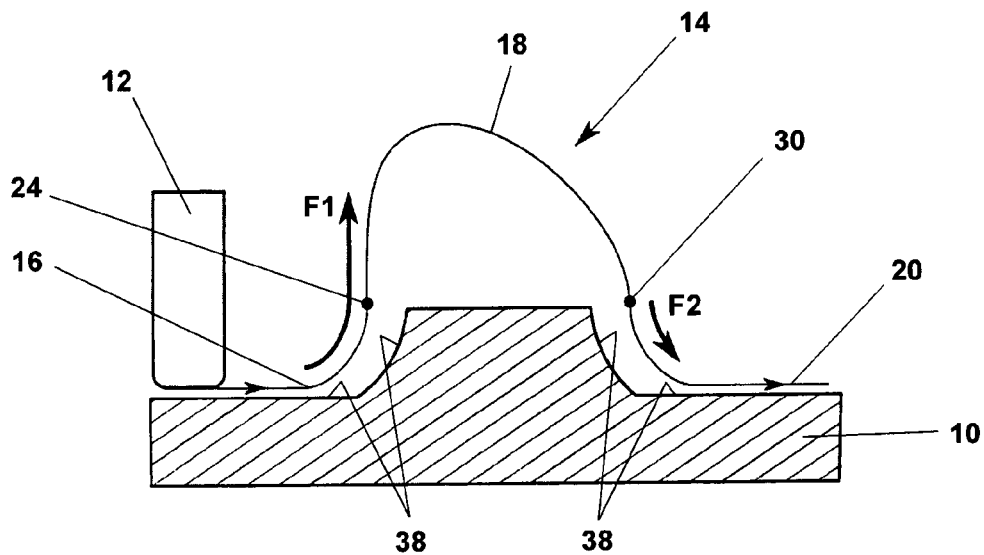

The embodiment of the method according to the invention shown in FIG. 1d differs from these ones of FIGS. 1a to 1c in a surface machining of surfaces 38 of the blank 10. In this case, the connecting movement of the tool 12, which is for example designed as a milling tool or a drilling tool, may lead out of or in a machining operation of surfaces 38.

Figure 1E:
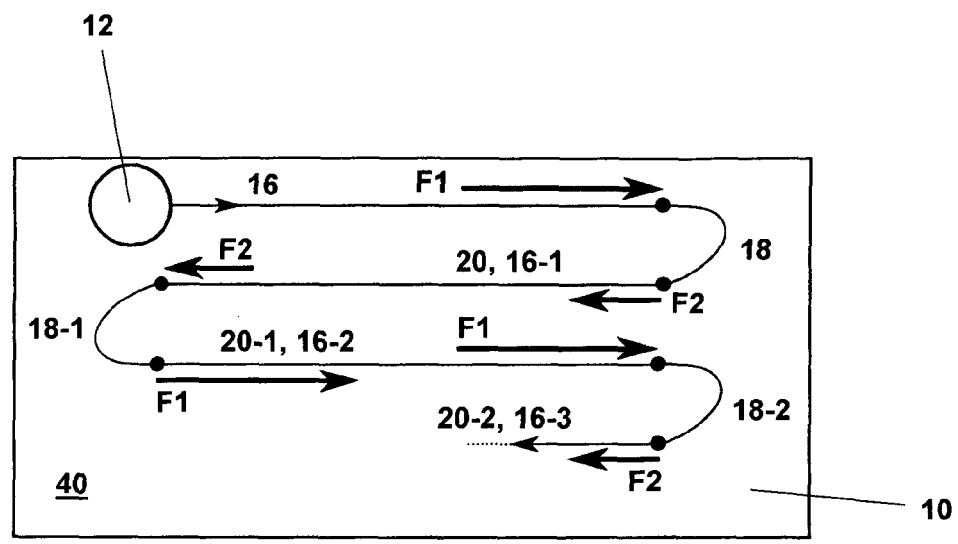
Figure 2A:
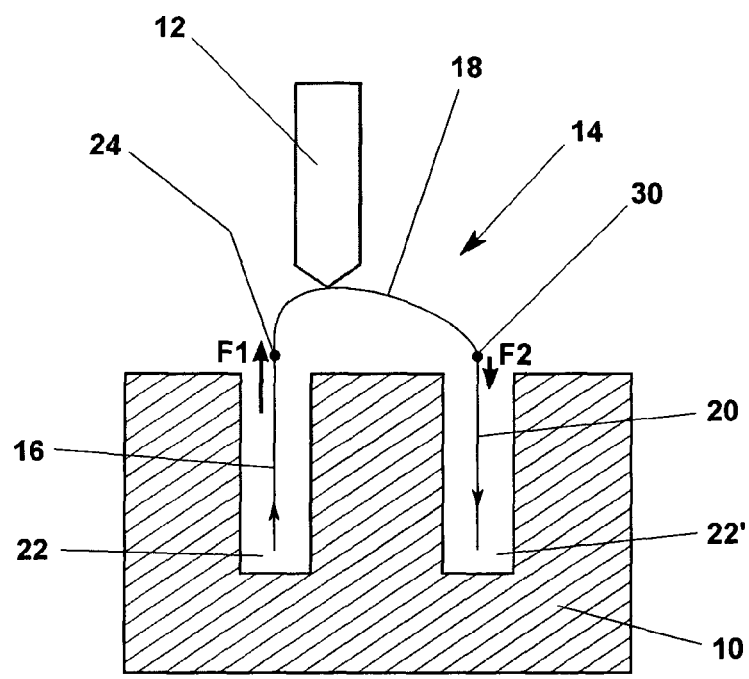
Figure 2B:
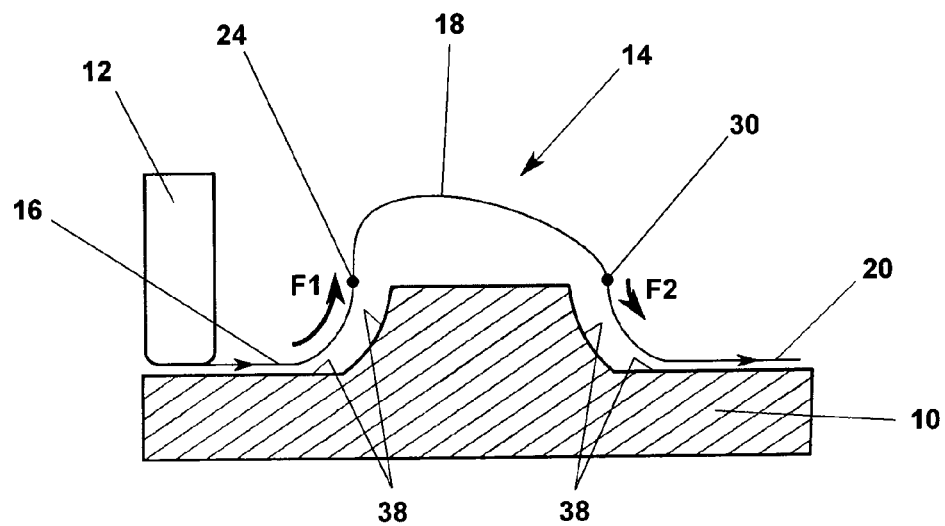

In the embodiment shown in FIG. 1e, the method according to the invention is also applied to surface machining by means of a tool 12, preferably in the form of a milling tool. Thereby, connecting movements are directly performed within a local machining area 40 without vertical retractions (and consequently where required by engaging the material), for example, between the machining and connecting segments 16, 18, 20 of a line-by-line zigzag machining pattern path with alternating advance directions. In practice, both shown, in amount differing forward feeds F1 and F2 of the machining segments 16, 20 result from the fact that depending on the advance direction, either conventional or climb milling is performed, and with conventional milling a lower forward feed F2 is often required to reduce wear of the tool 12.

In the following, the process is correspondingly repeated. The second machining segment 20 thus becomes the first machining segment 16-1 and is connected via another, second connecting segment 18-1 to a subsequent machining segment 20-1, which quasi represents the second machining segment 20-1. The second machining segment 20-1 then becomes the first machining segment 16-2 and is connected via another, third connecting segment 18-2 to an again subsequent machining segment 20-2, which quasi represents the second machining segment 20-2. The second machining segment 20-2 then becomes the first machining segment 16-3, and so on.

The existing forward feed F1 at the end 24 of the first machining segment 16 and/or the existing forward feed F2 at the start 30 of the second machining segment 20 is/are also determined for the height or length of the connecting segment 18. In the examples of embodiments of FIGS. 2a and 2b, forward feeds F1 and F2 are only half as large as these ones of FIGS. 1a and 1d. Accordingly, the resulting connecting segment 18 is only half as high. The technological reason is that the smaller forward feed F1 at the end 24 of the first machining segment 16 allows a stronger curvature and therefore a stronger change of direction, and a flatter shape of the connecting segment 18.

Figure 3:
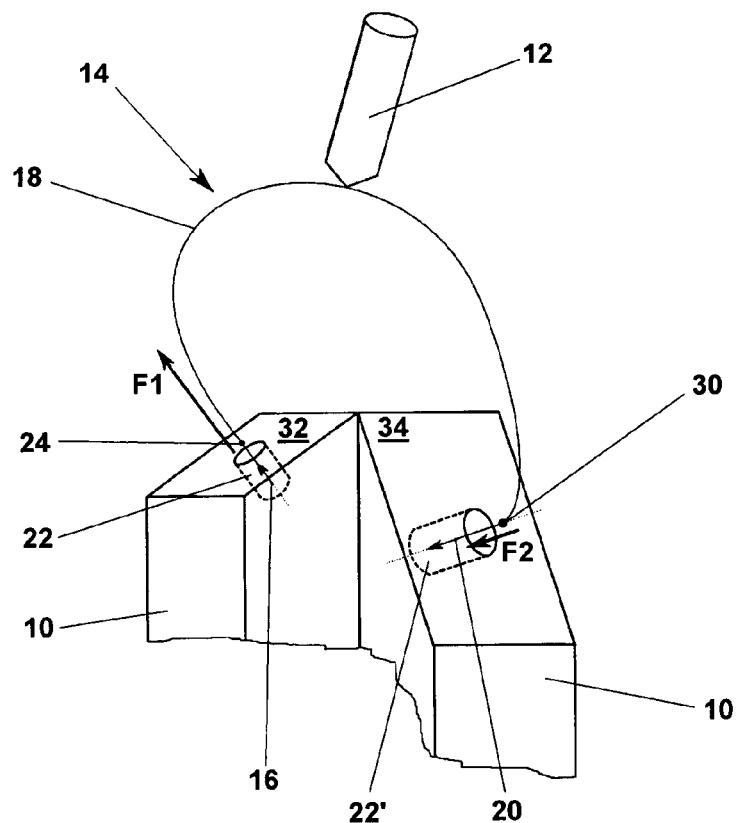

In FIG. 3 is shown another embodiment of the method according to the invention, which is used for a drilling process, as an alternative to these ones of FIGS. 1a to 1e. Accordingly, the method according to the invention is not restricted to the two-dimensional case, wherein the two machining segments 16, 20 and—consequently, also the connecting segment 18—are in the same plane. Instead, the method according to the invention is also applicable to the three-dimensional case, wherein the two machining segments 16, 20 and the connecting segment 18 may be arbitrarily located in the space. FIG. 3 shows such an example of such an embodiment by means of two blanks 10 having two holes 22, 22' on the sides 32, 34, the axes of which are skewed. The resulting connecting segment 18 between the two machining segments 16, 20 extends across the three-dimensional space.

As an example, yet another embodiment of the method according to the invention is shown in FIGS. 4a and 4b, again subjected to surface machining by means of a tool 12, e.g. a milling tool. Connecting movements of the tool 12 are performed within two (or more) successive local machining areas 40, 40' on one side or, as here, on several different sides 32, 34 of a blank 10 or a workpiece. The connecting segments 18, 18-1, 18-2 etc. within the respective local machining areas 40, 40' correspond to those ones in the example of embodiment shown in FIG. 1e. The forward feed F1 is always chosen to be larger than the forward feed F2.

Figure 4A:
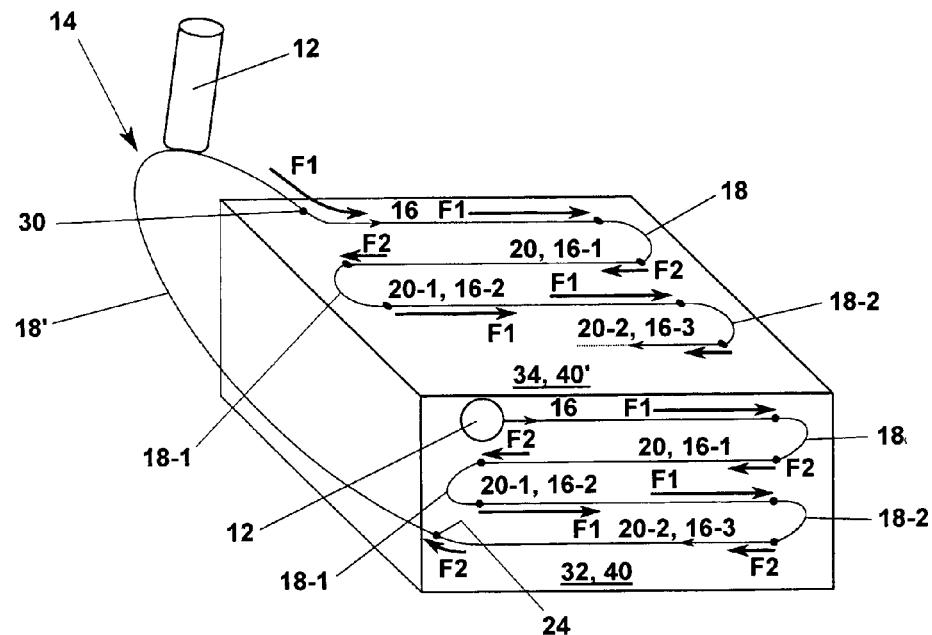
Figure 4B:
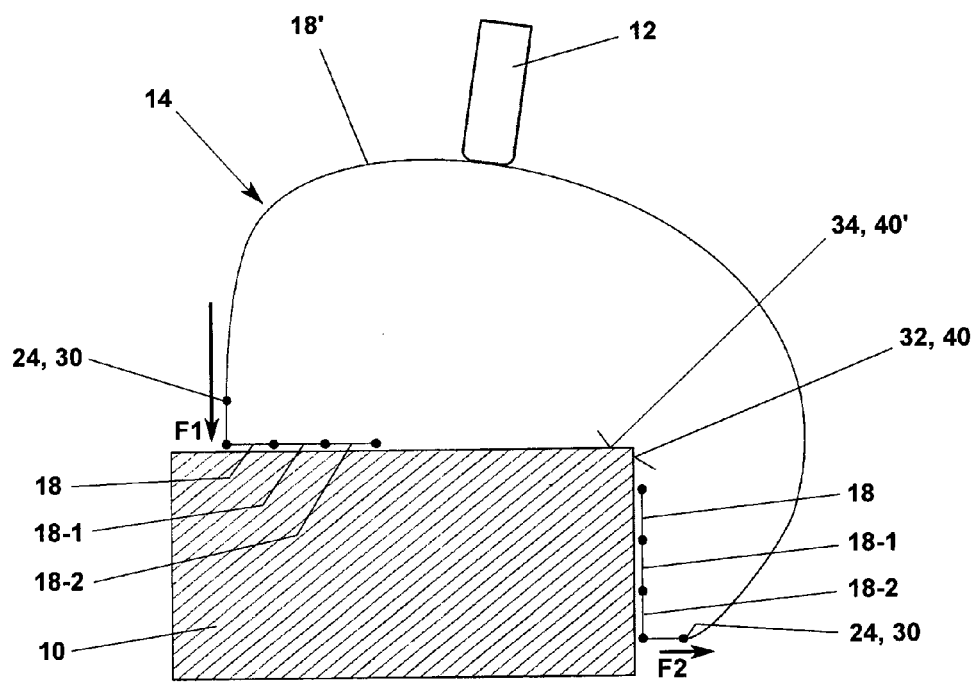

The change or movement of the tool 12 from the end point 24 of a local machining area 40 on the side 32 to the start point 30 of the other local machining area 40' on the other side 34 of the blank 10 is carried out by the connecting segment 18'. As shown in FIG. 4a, its shape is determined by the forward feed F2 at the end point 24 of the last machining segment 20-2 of the one local machining area 40 on the first side 32 and the forward feed F1 at the start point 30 of the first machining segment 16 of the other local machining area 40' on the next side 34. According to FIGS. 4a and 4b, the forward feed F2 is because of the surface machining in the local area 40 smaller than the forward feed F1.

Figure 5A:
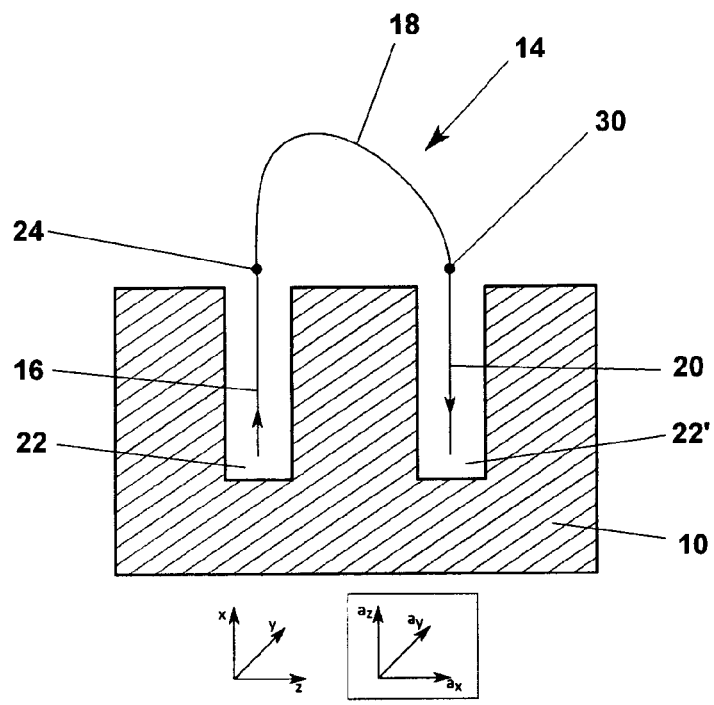

In order to consider specific dynamic properties of a machine tool, the method according to the invention further allows the possibility to consider an anisotropic axis acceleration profile in the calculation of the connecting segments (s) 18. A machine axis having strong acceleration capability enables more quickly changes of the forward feed and of the direction, respectively, of the tool 12 in the direction of this axis. In the method according to the invention, this can be exploited by integrating the acceleration capabilities of the axes into the guide path calculation process in order to optimize the shape of the connecting segments with regard to the machine. FIG. 5a shows at first the typical case of a uniform (isotropic) axis acceleration profile and a connecting segment 18 calculated in accordance with this configuration using the method of the invention, comparable to that one shown in FIG. 1a.

Figure 5B:
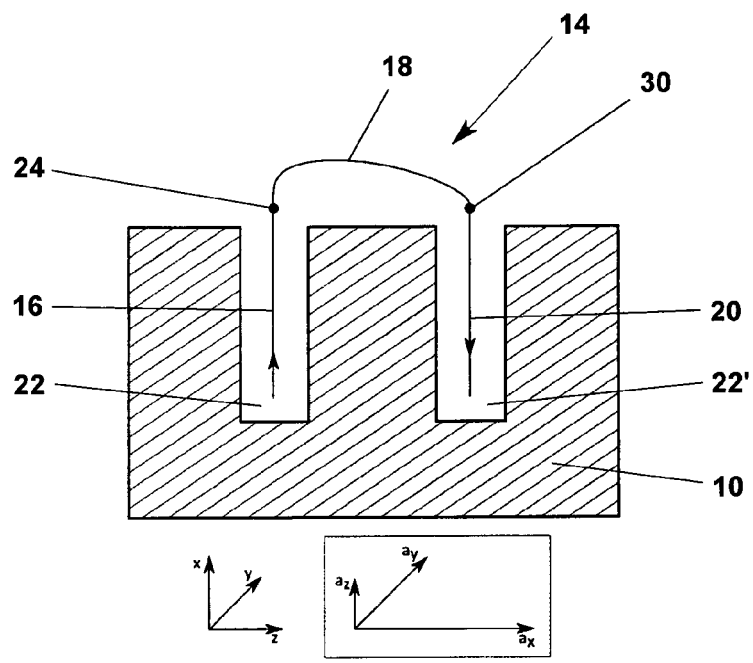

In contrast, FIG. 5b shows an anisotropic axis acceleration profile, wherein the maximal acceleration az in z-axis direction is much smaller than the maximal acceleration ax in x-axis direction (this description is easily applied to other configurations as well, particularly those ones in that also the y-axis is involved). The connecting segment 18 is now additionally deformed dependent on the maximal acceleration values. This deformation directly follows the forward feed-dependent curve calculation or deformation, but—without being shown in detail—may also be integrated into the forward feed-dependent calculation or deformation process.

Figure 6A:
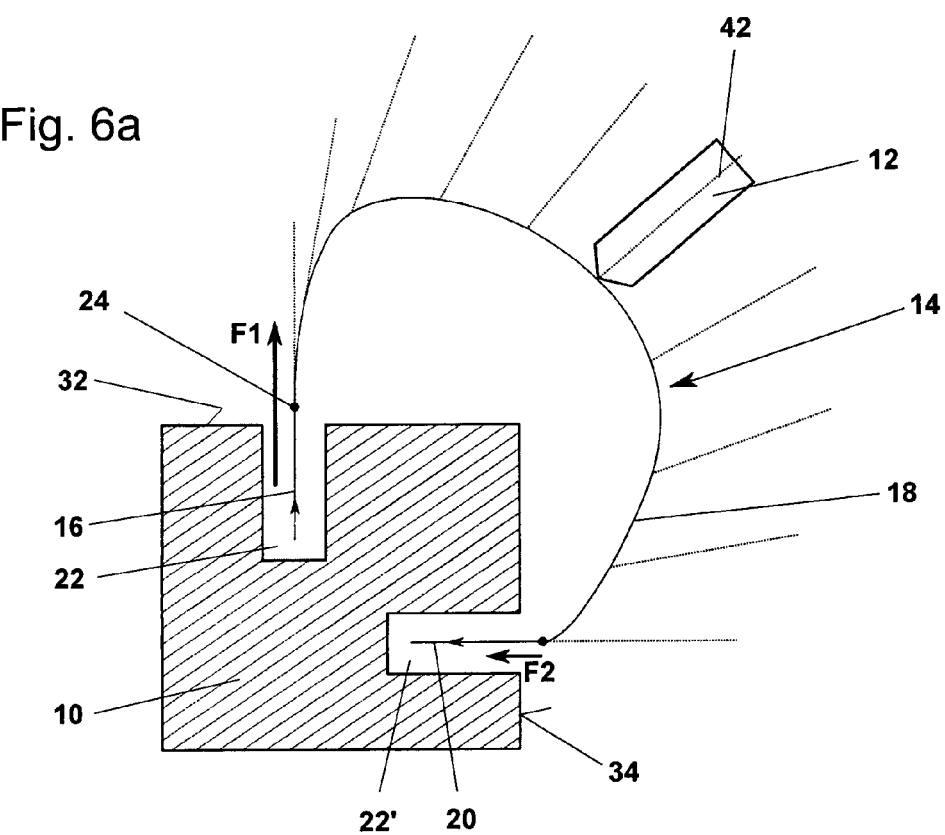
Figure 6B:
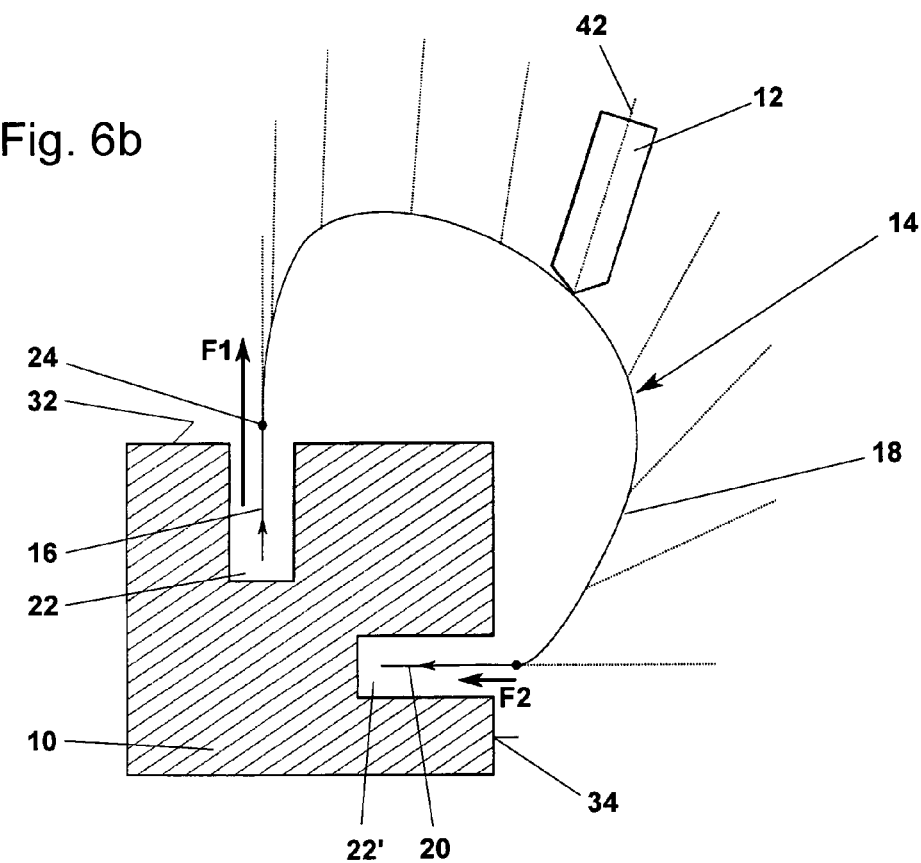
Figure 7A:
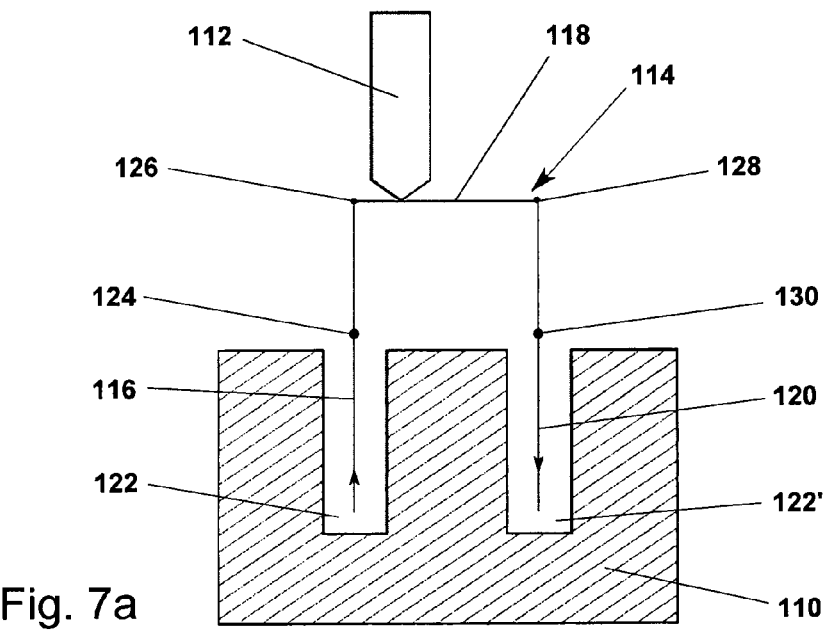
Figure 7B:
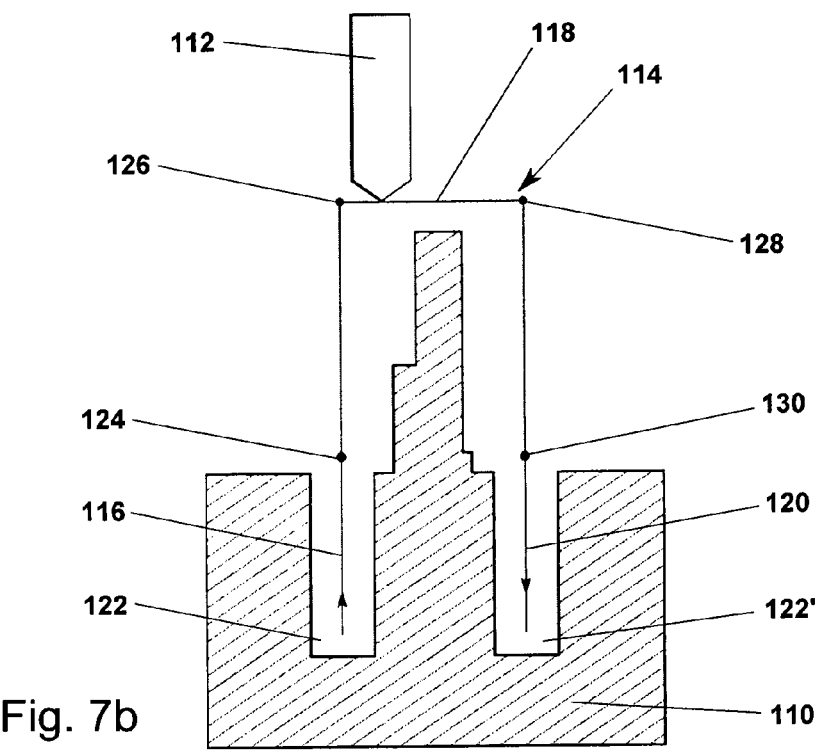
Figure 7C:
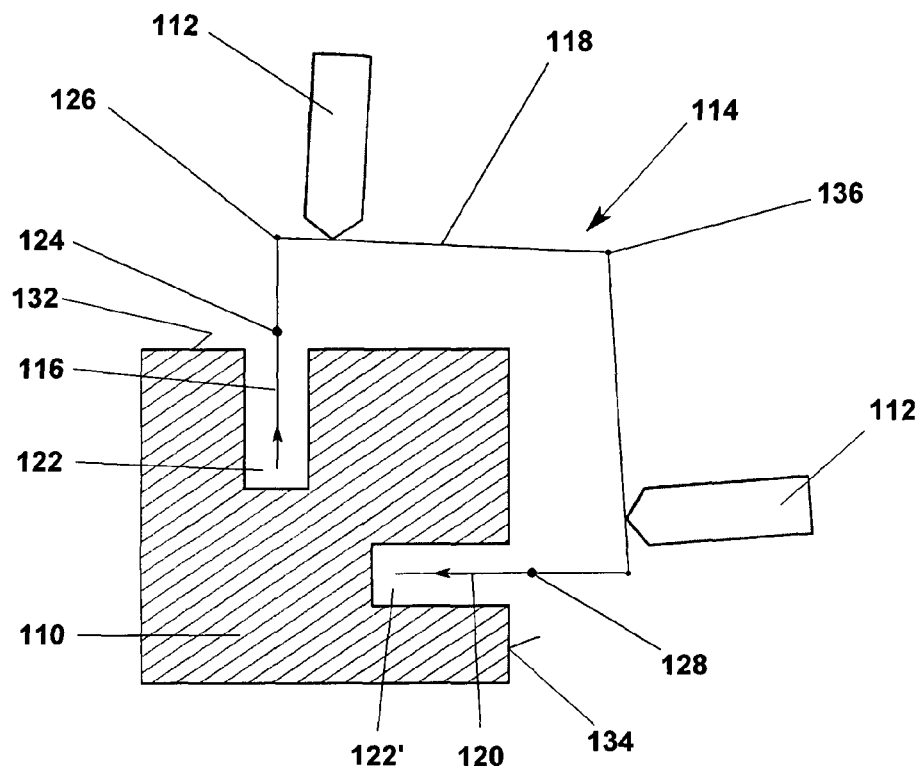
Figure 7D:
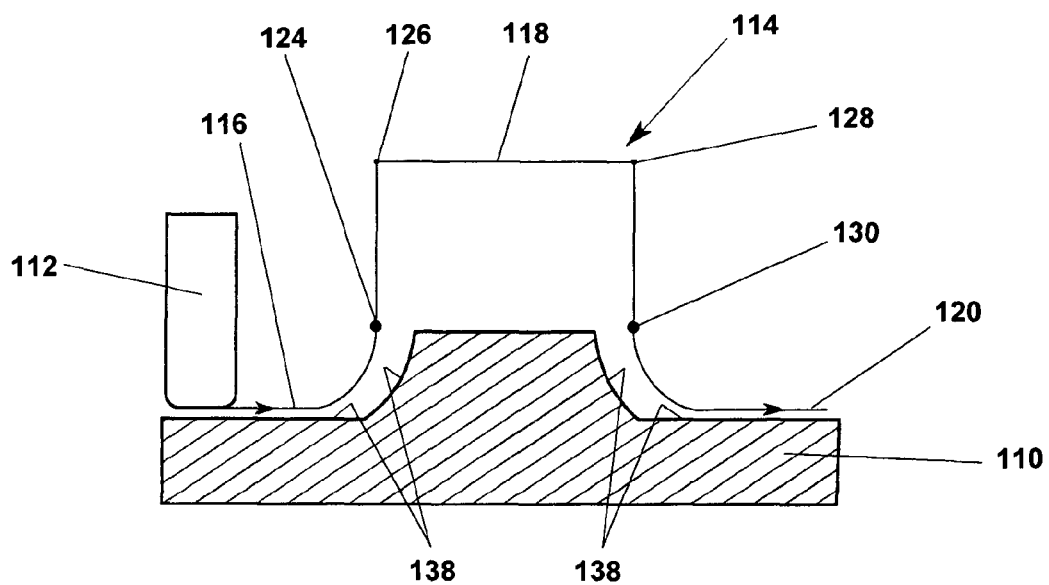
Figure 7E:
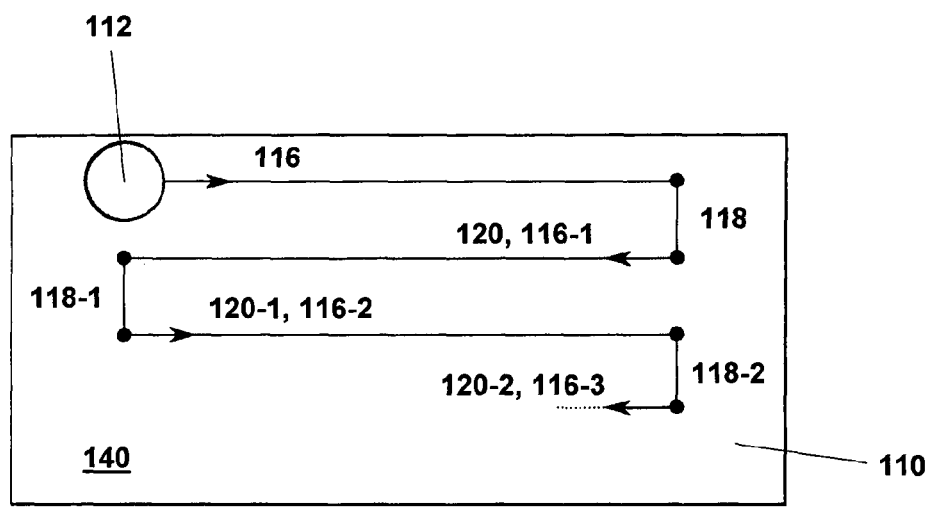

In yet another embodiment of the method according to the invention, concerning a drilling process according to FIGS. 6a and 6b and/or a surface machining process (not shown), the progression of the tool orientation and the adjustment of the rotational axes, respectively, respectively related to the respective connecting movement of the tool 12 can also be optimized.

Generally, as shown in FIG. 6a, the orientation of the tool 12 is strictly defined only at the end or end point 24 of the first machining segment 16 and at the start or start point 30 of the second machining segment 20. Consequently, the orientation of the tool 12 may be interpolated in an arbitrary way along the connecting segment 18 between the start and end points 24, 30. Known methods propose to interpolate often simply evenly, using a constant angular step per length unit, wherein the dotted lines indicating the progression of the respective axis 42 of the tool 12.

However, since different large forward feeds exist at the end or end point 24 of the first machining segment 16 and at the start or start point 30 of the second machining segment 20, the resulting angular step per time unit may vary along the connecting segment 18 when using such methods. Obviously, this results in uneven motion of the tool 12. For this reason, with the method according to the invention the forward feeds are additionally incorporated. For example, the angular step may be calculated inversely proportional to the local forward feed. As illustrated in FIG. 6b, a high forward feed only results in a small angular change per length unit and a lower forward feed results in a larger angular change per length unit.

Preferably, the tool 12 is moved on the guide path 14 in a collision-free manner.

Finally, it is envisaged according to the method of the invention that the tool 12 is moved on a guide path 14 that is embodied in the form of a tangent- or curvature-continuous curve.

The invention is not limited to the embodiments of the method according to the invention according to FIGS. 1a to 6b. Thus, it is possible to arbitrarily combine the embodiments of the method according to the invention with each other. Furthermore, the invention is totally independent from the type of the machining process, that being in particular a drilling process or a surface machining process. Without restricting the invention, the tool 12 may be for example a milling tool, a drilling tool or a laser. Finally, with the method according to the invention, the connecting segment 18 may as well, with the same effect, be determined in its shape depending on the forward feed F1 of the tool 12 at the start or start point of the connecting segment 18, which coincides with the end point 24 of the first machining segment 16, and the forward feed F2 of the tool 12 at the end or end point of the connecting segment 18, which coincides with the start point 30 of the second machining segment 20, and consequently be deformed towards the higher forward feed F1, F2 of the connecting segment 18 at its start or its end.

The invention claimed is:

1. Method for machining a blank (10) by means of a tool (12) for producing a finished part, wherein the tool (12) is moved during the machining on a guide path (14) comprising at least three successive path segments (16, 18, 20; 16-1, 18-1, 20-1; 16-2, 18-2, 20-2; 18') in the form of two machining segments (16, 20; 16-1, 20-1; 16-2, 20-2) and one connecting segment (18; 18-1; 18-2; 18'), which connects the two machining segments (16, 20; 16-1, 20-1; 16-2, 20-2) to one another, characterized in that the connecting segment (18; 18-1; 18-2; 18') of the path segments (16, 18, 20; 16-1, 18-1, 20-1; 16-2, 18-2, 20-2; 18'), which connecting segment connects the two machining segments (16, 20; 16-1, 20-1; 16-2, 20-2), is determined in terms of its shape by the forward feed (F1) of the tool (12) at the end (24) of the first machining segment (16) and by the forward feed (F2) of the tool (12) at the start (30) of the second machining segment (20), wherein the connecting segment (18; 18-1; 18-2; 18') of the path segments (16, 18, 20; 16-1, 18-1, 20-1; 16-2, 18-2, 20-2; 18'), which connects the two machining segments (16, 20; 16-1, 20-1; 16-2, 20-2) with one another, is deformed towards the higher forward feed (F1, F2) at the end (24) or at the start (30) of the two machining segments (16, 20).

2. Method according to claim 1, characterized in that the connecting segment (18; 18-1; 18-2; 18') of the path segments (16, 18, 20; 16-1, 18-1, 20-1; 16-2, 18-2, 20-2; 18'), which connects the two machining segments (16, 20; 16-1, 20-1; 16-2, 20-2) with one another, is deformed according to a ratio of the forward feed (F1) of the tool (12) at the end (24) of the first machining segment (16) to the forward feed (F2) of the tool (12) at the start (30) of the second machining segment (20).

3. Method according to claim 1, characterized in that the connecting segment (18; 18-1; 18-2; 18') of the path segments (16, 18, 20; 16-1, 18-1, 20-1; 16-2, 18-2, 20-2; 18'), which connects the two machining segments (16, 20; 16-1, 20-1; 16-2, 20-2) to one another, is deformed towards the first machining segment (16), if the ratio of the forward feed (F1/F2) of the tool (12) is larger than 1, and is deformed towards the second machining segment (20), if the ratio of the forward feed (F1/F2) is smaller than 1.

4. Method according to claim 1, characterized in that the height or length of the connecting segment (18; 18-1; 18-2; 18') of the path segments (16, 18, 20; 16-1, 18-1, 20-1; 16-2, 18-2, 20-2; 18') is determined by the amount of the forward feed (F1, F2) of the tool (12) at the end (24) of the first machining segment (16) and/or at the start (30) of the second machining segment (20).

5. Method according to claim 1, characterized in that the connecting segment (18; 18-1; 18-2; 18') of the path segments (16, 18, 20; 16-1, 18-1, 20-1; 16-2, 18-2, 20-2; 18') is adapted to a corresponding anisotropic acceleration profile of a machine tool carrying the tool (12).

6. Method according to claim 1, characterized in that the tool (12) is moved during the machining on the guide path (14) with the first machining segment (16) and the second machining segment (20) in engagement with the material of the blank (10).

7. Method according to claim 1, characterized in that the tool (12) is moved during the machining on the guide path (14) with the connecting segment (18; 18-1; 18-2; 18') between the first machining segment (16; 16-1; 16-2) and the second machining segment (20; 20-1; 20-2) without engagement or in engagement with the material of the blank (10).

8. Method according to claim 1, characterized in that the tool (12) is moved on the guide path (14) in the area of the connecting segment (18; 18-1; 18-2; 18') of the path segments (16, 18, 20; 16-1, 18-1, 20-1; 16-2, 18-2, 20-2; 18') with an evenly interpolated and/or forward feed-dependently interpolated orientation of the tool (12).

9. Method according to claim 1, characterized in that the tool (12) is moved on the guide path (14) having at least two machining segments (16, 20; 16-1, 20-1; 16-2, 20-2) having alternating advance directions.

10. Method according to claim 1, characterized in that the tool (12) is moved on a guide path (14) that is embodied in the form of a tangent-continuous or curvature-continuous curve.

11. Method according to claim 1, characterized in that the tool (12) is moved on the guide path (14) in a collision-free manner.

12. Method according to claim 1, characterized in that the tool (12) is a milling tool, a drilling tool or a laser tool.

* * * * *